(12) United States Patent
Pfleger et al.

(10) Patent No.: US 8,434,210 B2
(45) Date of Patent: May 7, 2013

(54) METHOD OF ASSEMBLING DRIVE MEMBER WITH SHAFT COUPLED TO ROTOR OF ROTATING ELECTRICAL MACHINE

(75) Inventors: Alexandre Pfleger, Noisy-le-Grand (FR); Karine Stofleth, Maisons Alfort (FR); Dirk Schulte, Fontenay Sous Bois (FR); Romaric Lenoir, Ste Cecile (FR); Yves Ducrocq, Gournay-Verchocq (FR)

(73) Assignee: Valeo Equipements Electriques Moteur, Creteil (FR)

( * ) Notice: Subject to any disclaimer, the term of this patent is extended or adjusted under 35 U.S.C. 154(b) by 1222 days.

(21) Appl. No.: 12/160,332

(22) PCT Filed: Feb. 28, 2007

(86) PCT No.: PCT/FR2007/050856
§ 371 (c)(1),
(2), (4) Date: Jul. 17, 2008

(87) PCT Pub. No.: WO2007/099260
PCT Pub. Date: Sep. 7, 2007

(65) Prior Publication Data
US 2009/0158576 A1 Jun. 25, 2009

(30) Foreign Application Priority Data
Mar. 1, 2006 (FR) .................................. 06 01808

(51) Int. Cl.
*H02K 7/00* (2006.01)
*H02K 7/118* (2006.01)

(52) U.S. Cl.
USPC .................. 29/525.14; 29/893.2; 29/898.07; 29/732; 310/263; 474/94

(58) Field of Classification Search .................. 29/893.1, 29/893.2, 898.07, 525.13, 525.14, 732, 270, 29/278; 310/92, 263, 75 R; 474/94, 95; 254/133 R, 103, 100; 173/164; 408/203.5
See application file for complete search history.

(56) References Cited

U.S. PATENT DOCUMENTS

| | | | | |
|---|---|---|---|---|
| 1,371,965 A | * | 3/1921 | York | 81/460 |
| 2,512,426 A | * | 6/1950 | Hartley | 228/140 |
| 2,550,223 A | * | 4/1951 | Carlin et al. | 290/1 C |
| 2,767,590 A | * | 10/1956 | Currier | 198/842 |
| 3,294,219 A | * | 12/1966 | Mayrath | 198/608 |
| 3,296,691 A | * | 1/1967 | Bien | 29/434 |
| 3,383,934 A | * | 5/1968 | Flynn | 474/44 |

(Continued)

FOREIGN PATENT DOCUMENTS

DE 195 43 541 A1 11/1996
EP 0 359 653 3/1990

(Continued)

*Primary Examiner* — David Bryant
*Assistant Examiner* — Jason L Vaughan
(74) *Attorney, Agent, or Firm* — Berenato & White, LLC

(57) ABSTRACT

The invention relates to a device for assembling, by screwing, a drive member, such as a drive pulley, with a shaft intended to be coupled to the rotor of a rotating electrical machine, the device including an additional, welded connection. According to the invention, this method of producing the assembly device is characterized in that the drive member screwed onto its shaft in the vertical position is welded from below. The invention can be used for rotating electrical machines, such as an alternator or a starter-alternator of a motor vehicle.

8 Claims, 1 Drawing Sheet

U.S. PATENT DOCUMENTS

| | | | | |
|---|---|---|---|---|
| 3,611,821 | A * | 10/1971 | Legler | 474/45 |
| 3,643,853 | A * | 2/1972 | Hiller | 228/41 |
| 3,648,532 | A * | 3/1972 | Vallieres | 474/14 |
| 4,016,642 | A * | 4/1977 | Kraft et al. | 29/509 |
| 4,118,848 | A * | 10/1978 | Goldschmidt et al. | 29/893.2 |
| 4,153,832 | A * | 5/1979 | Iio et al. | 219/124.34 |
| 4,402,678 | A * | 9/1983 | St. John | 474/171 |
| 4,414,459 | A * | 11/1983 | Sims et al. | 219/73.2 |
| 5,418,400 | A | 5/1995 | Stockton | |
| 5,735,762 | A * | 4/1998 | Fasterding et al. | 474/166 |
| 5,744,882 | A * | 4/1998 | Teshima et al. | 310/67 R |
| 5,759,127 | A * | 6/1998 | Reicks | 474/197 |
| 5,816,973 | A * | 10/1998 | Sudau et al. | 475/347 |
| 6,004,082 | A * | 12/1999 | Ruhlmann et al. | 408/1 R |
| 6,022,286 | A * | 2/2000 | Jackson et al. | 474/170 |
| 6,497,515 | B1 * | 12/2002 | Sahashi et al. | 384/544 |
| 6,548,935 | B1 * | 4/2003 | Shendi et al. | 310/263 |
| 6,682,225 | B2 * | 1/2004 | Sahashi et al. | 384/544 |
| 6,700,256 | B2 * | 3/2004 | Fukutani et al. | 310/90 |
| 6,704,991 | B1 * | 3/2004 | Coulborn et al. | 29/525.14 |
| 6,758,781 | B2 * | 7/2004 | Kusumoto et al. | 475/13 |
| 6,809,443 | B2 * | 10/2004 | Nakamura et al. | 310/68 D |
| 6,838,805 | B2 * | 1/2005 | Oohashi et al. | 310/261.1 |
| 7,140,086 | B2 * | 11/2006 | Heaton | 29/271 |
| 7,155,824 | B2 * | 1/2007 | Prucher | 29/893.1 |
| 7,347,309 | B2 * | 3/2008 | Wiesneth et al. | 192/45 |
| 7,781,923 | B2 * | 8/2010 | Koumura et al. | 310/43 |
| 2002/0047485 | A1 * | 4/2002 | Okawa | 310/263 |
| 2003/0008742 | A1 * | 1/2003 | Kay | 474/182 |
| 2003/0048035 | A1 * | 3/2003 | Oohashi et al. | 310/263 |
| 2003/0081872 | A1 * | 5/2003 | Sahashi et al. | 384/544 |
| 2005/0119077 | A1 * | 6/2005 | Faucon et al. | 474/70 |

FOREIGN PATENT DOCUMENTS

| | | |
|---|---|---|
| EP | 1 293 665 A2 | 3/2003 |
| FR | 2813105 A1 * | 2/2002 |
| FR | 2 828 774 | 2/2003 |
| FR | 2 839 397 | 11/2003 |
| WO | WO 01/69762 A1 | 9/2001 |

* cited by examiner

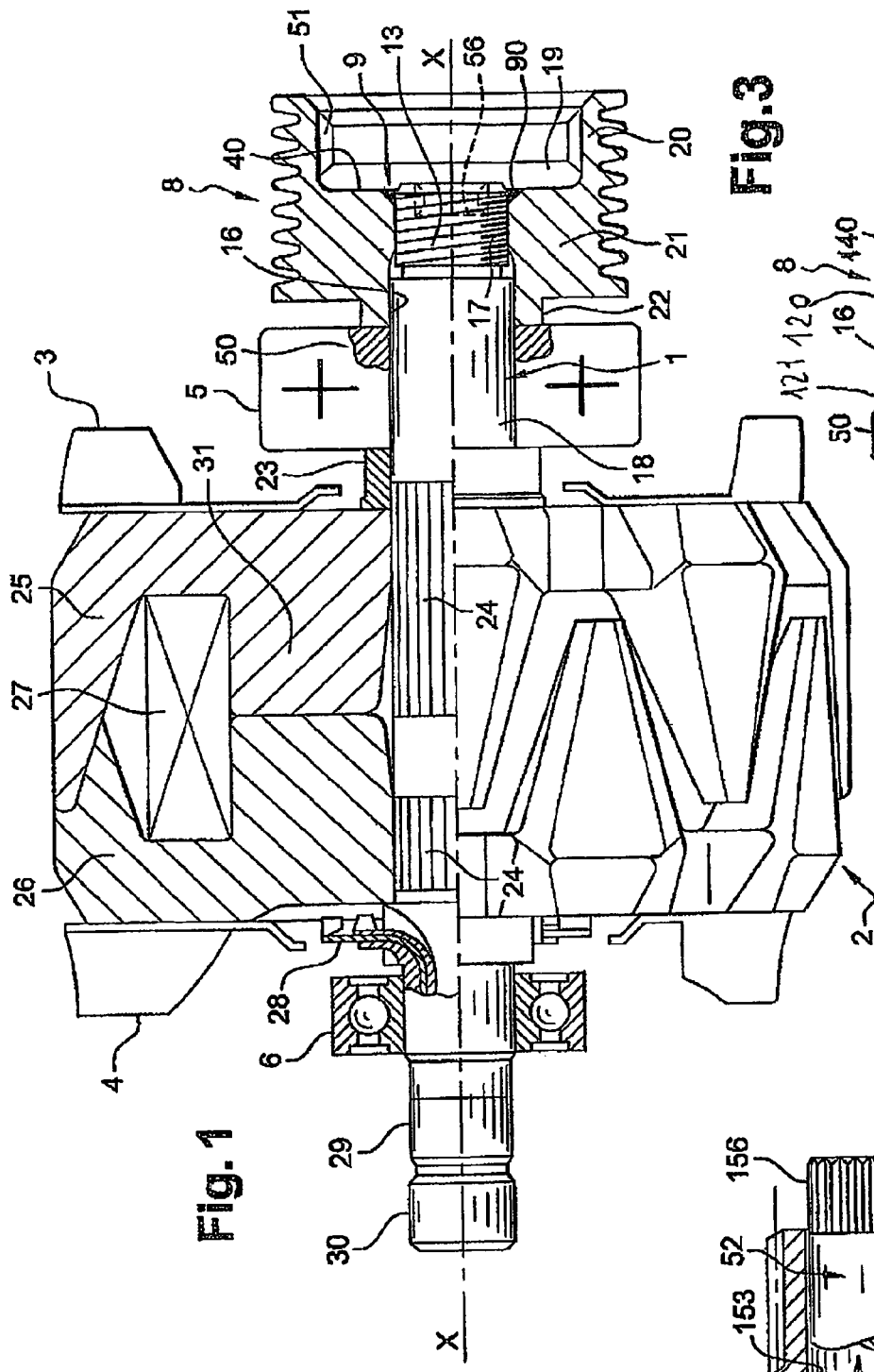
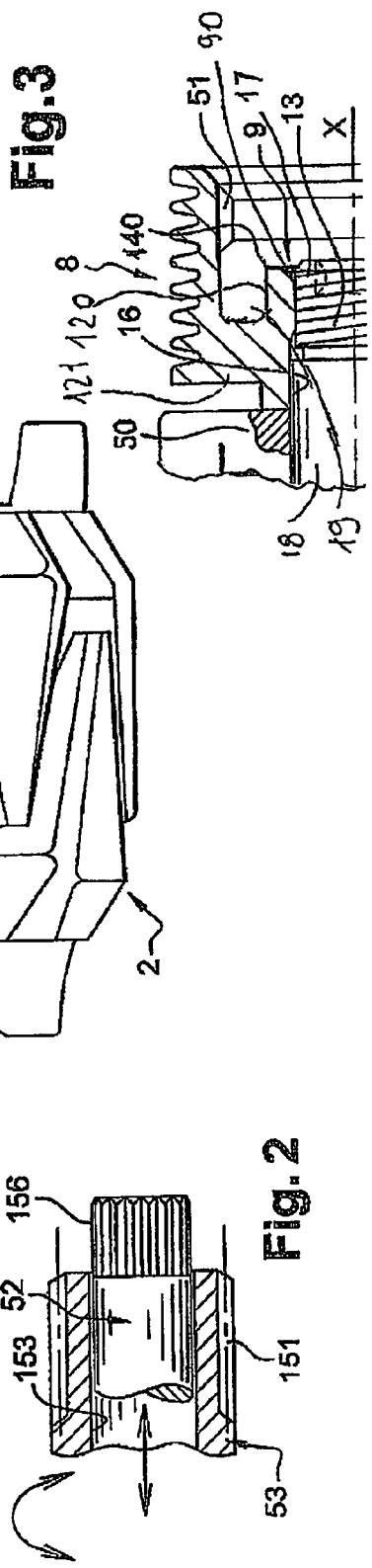

METHOD OF ASSEMBLING DRIVE MEMBER WITH SHAFT COUPLED TO ROTOR OF ROTATING ELECTRICAL MACHINE

CROSS-REFERENCE TO RELATED APPLICATIONS AND CLAIM TO PRIORITY

This application relates to International Application No. PCT/FR2007/050856 filed Feb. 28, 2007 and French Patent Application No. 0601808 filed Mar. 1, 2006, of which the disclosures are incorporated herein by reference and to which priority is claimed.

SCOPE OF THE INVENTION

The present invention relates to a device for assembling, by screwing, a drive member, such as a drive pulley, with a shaft intended to be coupled to the rotor of a rotating electrical motor, such as an alternator or a starter-alternator of a motor vehicle, with the said drive member comprising, on the one hand, a cavity having a base or a sleeve and, on the other, a central hole having an internally threaded section, opening out at a level of the front face of the base or of the sleeve, while the shaft has, at its front part, a threaded section intended to engage with the internally threaded section of the drive member in order to screw this latter.

The invention also relates to a process for the manufacture of such an assembly device.

TECHNOLOGY STATUS

The principle of assembling by screwing a drive member, such as a pulley, onto the shaft of a rotor of a rotating electrical motor in the form of an alternator for motor vehicles is already known.

To do this, the pulley comprises a central axial hole for the passage of the shaft. This hole has a threaded interior in the form of a tapped thread, which is screwed onto a threaded part of the rotating shaft. This screwing action is continued until the support of the pulley comes to rest against an axially mounted stop borne by the shaft.

This stop is formed, for example, by the internal race of a set of ball bearings mounted in the motor for the rotating mounting of the shaft, or, alternatively by a cross-piece arranged axially between the pulley and the internal race of the said bearings.

In all cases, as soon as the pulley comes into contact with the axial stop, tension is applied to the assembly device, which provides resistance to slippage between the pulley and the shaft.

The direction of the internal thread of the pulley and the threaded end of the shaft are preferably chosen in such a way that, as the alternator functions, the rotation of the pulley and the rotor has the effect of screwing the assembly device.

This is a satisfactory solution.

Nevertheless, it is desirable that the assembly is able to withstand high torque levels, for example greater than 70 Nm, especially when a heat engine is started for starter-alternators, which are, as is already known, reversible alternators, which also transform electrical energy into mechanical energy, especially for starting the heat engine of the vehicle. During this process of starting the heat engine, the torque tends to loosen the pulley.

OBJECT OF THE INVENTION

The aim of the present invention is to propose a solution that satisfies this requirement.

To achieve this aim, the screwed assembly device in accordance with the present invention is characterised by the fact that it has a supplementary welded link effected between the front face of the base or the sleeve of the drive member and the threaded part of the shaft.

As a result of the invention, a stable and reliable assembly is obtained between the shaft and the drive member without any major modifications being made to the assembly device with its reduced number of parts.

This device transmits major torque levels and can withstand the phenomena of acyclism in the heat engine of the vehicle.

Because the assembly is carried out by screwing, the connection can be made by welding.

More precisely, the process for the manufacture of the screwed assembly device in accordance with the present invention comprises a stage in which the drive member is screwed onto the threaded part of the shaft, followed by a welding operation, during which the shaft, fitted with the drive member is presented vertically for the welding process, which is carried out from underneath the drive member.

During the welding process, the pulley functions as a protective screen.

In accordance with other characteristics, taken either individually or in combination:
  the supplementary join consists of a TIG type weld with or without a filler material;
  the supplementary join consists of a laser type weld, especially of the transparency type;
  the supplementary join consists of a weld of the MIG or MAG type;
  the base or the sleeve is chamfered to assist the welding operation.

The invention will be better understood and other aims, characteristics, details and advantages of the invention will become more clear from the following description and its references to the attached drawings.

A BRIEF DESCRIPTION OF THE DRAWINGS

FIG. 1 is an aspect, partially in an axial section, through a simplified rotating electrical motor, comprising a device assembled by screwing the drive member, in the form of a pulley, with the rotor of the motor, in accordance with the invention;

FIG. 2 is an aspect, partially in a section, of the ends of the screwing tools of the drive member on the shaft in FIG. 1;

FIG. 3 is a partial aspect of the front part of the rotating electrical motor, comprising a modified drive member in comparison with that shown in FIG. 1.

DESCRIPTION OF THE INVENTION

FIG. 1 depicts a screwed assembly device 9 in accordance with the present invention, applied to a rotating electrical motor in the form of an alternator or alternatively a reversible alternator, otherwise known as a starter-alternator, having a drive member in the form of a pulley 8 with a circular shape, which screws onto a shaft 1 coupled to the rotor 2 of the motor.

FIG. 1 depicts only those parts of the electrical rotating motor that are necessary for an understanding of the invention, namely, the shaft 1, the rotor 2, which is connected in a rotating manner to the shaft, the front and rear ventilators, respectively 3 and 4, the front and rear ball bearings, respectively 5 and 6, supporting the shaft 1 for the rotating assembly of this shaft 1, the drive member 8 and the screwing assembly device 9 of the drive member 8 with the shaft 1 presenting a symmetrical X-X axis representing the axis of rotation of the rotating electrical motor.

In this type of motor, the shaft 1 is a driven shaft and represents an input shaft when the motor is an alternator or a starter-alternator operating in an alternator mode to transform mechanical energy into electrical energy. This shaft 1 is a driving shaft and represents an output shaft when the motor is a starter-alternator operating in the electric motor mode, in particular for starting the heat motor of the vehicle and to transform electrical energy into mechanical energy.

In all cases, the shaft 1 is coupled to the rotor 2. In the embodiment shown in FIG. 1, this coupling is achieved in a direct manner, with an interlocking effect with the rotor 2.

This alternator or starter-alternator comprises a wire-wound stator and a casing (not shown).

It will be recalled that the ball bearings 5, 6 are supported by perforated front and rear bearing blocks (not shown) forming part of the casing containing the wire-wound stator of the alternator or the starter-alternator. These front and rear bearing blocks each have a central bore section for installing the front and rear ball bearings, respectively 5 and 6, supporting the shaft 1. The pulley 8 is located outside the front bearing block in such a way that it is adjacent to the latter. The shaft 1 passes through the front bearing block and penetrates the drive member in the form of a pulley 8.

This shaft 1 is made of metal and has, at its front end, outside the front bearing block, a threaded section 13, while the pulley 8 has an axially orientated, central internal hole 16, 17, which is crossed by this section 13.

The axial hole 16, 17 comprises a smooth section 16 and a threaded section 17 in front of the hole.

The smooth section 16 is designed to receive, by means of a precise adjustment, an additional smooth section 18 of the shaft 1, on which is mounted the internal race of the ball bearings 5, which is larger than that of the ball bearings 6. This FIG. 1 also partially shows, 50, the internal race of the ball bearings 5, and completely, the internal race of the ball bearings 6.

The internal threaded section 17 is intended to function in a complementary manner, that is to say, to come into contact with a threaded part 13 of the shaft 1 represented in this embodiment by the front threaded end 13 of this shaft 1, in such a way that the pulley 8 becomes screwed onto the shaft 1. The screwed assembly device 9 thus comprises the section 17 and the threaded end 13. The section 17 is axially shorter than the front end 13, the outer diameter of which is less than that of the section 18.

In the same way, the diameter and the axial length of the section 16 are greater than those of the section 17.

At its outer periphery 20, which is circular in shape and axially orientated, the pulley 8 has a series of circumferential grooves, to accommodate an additional belt, with several of the said grooves belonging to the device driving the movement between the shaft 1 and the heat engine, such as the heat engine of a motor vehicle.

The pulley 8 is hollow at its front end. More precisely, this pulley 8 comprises, at its front end, a cavity 19 defined by the outer periphery 20 of the pulley and a base part 21, which is transversely orientated in relation to the axis X-X.

The central hole 16, 17, is effected as shown in the embodiment in FIG. 1 in the base 21, which is solid, and which has a circular rim 22 with an axial orientation and projects towards the ball bearing 5 to interact with the internal race 50 of the latter.

As an alternative, as can be seen in FIG. 3, the pulley 8 is deeper and is of the type described in the document FR A 2 813 105, in that the base consists of a cheek 121 installed at the rear of the pulley.

This rear cheek comprises a central sleeve 120, which projects laterally towards the exterior and is crossed by the shaft 1. This sleeve has two sections 16 and 17.

As an alternative, this base part is arranged between the axial ends of the sleeve with the sections 16, 17.

A cross-member 23 is arranged axially between the other end of the internal race 50 of the ball bearings 5 and the front face of the rotor 2 carried by the shaft 1. The rotor shown in FIG. 19 is a claw type motor, comprising in a known manner two pole wheels 25, 26 and an inductor coil 27 arranged axially between the wheels 25, 26. This coil 27 is supported by a core 31 formed in this instance from two half-cores, each cast together with the respective pole wheel.

The pole wheels 25, 26 and the core 31 are pierced centrally so that they can be forcibly fitted onto the metal shaft 1, which has, milled sections 24 at the front and back for this purpose.

The wheels 25, 26 and the core 31, in this case in a ferro-magnetic material, will therefore rotate and move together with the shaft 1, which is in a harder and a ferromagnetic material.

The ends of the coil 27 are connected by means of wire threads 28 to the collector rings 29, 30, against which the brushes (not shown) are rubbed.

The rings 30, 29 are integral with the rear end of the shaft 1.

For more precise details, reference is made by way of example to document WO 01/69762, which also shows front and rear bearing blocks, and in which the configuration of FIG. 1 is identical for an alternator and a starter-alternator.

In an initial stage of the manufacture of the motor therefore, the shaft 1 is forcibly inserted into the pole wheels 25, 26 and into the core 31 forming a sub-assembly of the rotor 2 and the shaft 1, which is then assembled between the front and rear bearing blocks of the alternator or the starter-alternator.

The pulley 8 thus projects axially in relation to the front bearing block.

In a second stage, the threaded internal section of the pulley 8 is screwed onto the threaded end 13 of the shaft 1.

During this screwing process, the pulley 8 comes to rest, in this case through the rear end of its projecting rim 22, against the axial stop formed by the internal race 50 of the front ball bearings 5 arranged axially by the cross-member 23. As an alternative, the projecting rim 22 is replaced by an interposed washer in such a way that during the screwing process, the rear end of the pulley 8 comes to rest against an axially arranged stop represented by this washer, which is held axially by the internal race 50 and the cross-member 23.

The said stop is therefore represented directly or indirectly by the race 50, carried by the shaft 1.

It is therefore during the screwing process that the assembly device is finally subjected to tension.

In one embodiment, the direction of the internal thread 17 of the pulley and the threaded end 13 of the shaft are preferably selected in such a way that as the alternator functions the rotation of the pulley and the rotor has a screwing effect on the assembly device. In other words, this direction corresponds to the direction of the pulley 8 when the shaft 1 is driven.

The screwing of the pulley 8 onto the shaft 1 is effected by means of tools 52, 53, the ends of which are visible in FIG. 2.

For this purpose, in FIG. 1 the tip of the threaded end 13 of the shaft comprises an indentation 56.

Similarly, the cavity 19 has an indentation 51 on its outer periphery.

In another embodiment, the indentation 56, 51 comprises a multiple internal toothing, into which, while the pulley is being assembled, another external multiple toothing 156, 151 of the internal tool 52 and the external tool 53, is enmeshed.

The indentation 56, 51 can comprise, as an alternative, a hexagonal or Tork (registered trademark) profile, or alternatively it can be in the form of a slit, with the tool 52, 53 having a complementary shape to that of the indentation 56, 51.

The tools 52, 53 are concentric, as can be seen in FIG. 2.

The external tool 53 has an internal bore 153 for the passage of the internal tool 152, which can be moved axially in one direction and in the other in relation to the external tool 53.

In FIG. 2, at 151 the external indentation of the tool 53 can be seen, which is intended to work in conjunction with the indentation 51 of the cavity 19, and at 156 the indentation of the internal tool 52 can be seen, which is intended to work in conjunction with the indentation 56 of the tip of the threaded end 13 of the shaft 1.

When the pulley 8 is screwed onto the shaft 1, the tool 52 does not rotate as long as the external tool 53 is rotating to carry out the screwing effect.

Clearly the reverse is also possible, with the tool 52 only rotating during the screwing operation when the tool 53 is fixed during the rotation of this operation.

In certain particular cases, where for example, major torques are to be imparted simultaneously and/or major acyclisms of the heat engine of the vehicle, slipping phenomena and even a slackening of the pulley may be observed.

This is more critical for a starter-alternator than an alternator, as in this case the shaft 1 is, depending on the operating mode, a driven or a driving shaft and a major toque has to be imparted in order to start the heat engine, through the shaft 1.

On the other hand, the torque that can be imparted with this type of assembly device will depend upon the tension of the assembly device, in that two functions are carried out by screwing the pulley 8 to the front end 13 of the shaft 1, namely the maintenance of the tension of the assembly device 9, and thus the axial position of the pulley, and also the transmission of the torque by rotation.

In order to resolve this problem and to increase the torque transmitted, use is made according to the present invention of an individual welded connection made between the shaft 1 and the pulley 8.

In this way, as a result of this additional connection, a reliable and durable transmission of the torque is achieved between the drive member, here the pulley 8, the ball bearings 5 and the cross-member 23. The assembly device 9 has therefore no slack.

This additional connection consists of a welded join, which can be seen at 90 in FIGS. 1 and 3. This welding is carried out at the end during a third stage after the first stages referred to above. To do this, it is essential that the pulley 8 and the shaft 1 are both made from a weldable material, in this case steel.

In the embodiment shown in FIG. 1, the pulley 8 is screwed onto the threaded end 13 of the shaft 1 and finally comes to rest against the stop, represented here by the internal race of the ball bearings 5 in such a manner as to produce a tension of between 2 and 6 tonnes during the second stage of the manufacturing process. Clearly, this tension level will depend upon the applications.

Then, during a final stage, a welded join is effected between, firstly, the tip of the threaded end 13 of the shaft 1, constituting the free front end of this shaft 1 and, secondly, the pulley 8, more precisely, the front face 40 of the base section 21, or alternatively, the front face of the sleeve of the pulley. The hole 16, 17 therefore opens out at the level of this front face.

In another embodiment, the front face 40 of the base section 21 or of the sleeve is flat.

In a further embodiment, the front face 40 of the base section 21 or the front face 140 of the sleeve 120 is initially centrally chamfered as can be seen in FIGS. 1 and 3. This chamfering is circular in shape and the hole 16, 17 opens out at the level of the chamfer.

With or without the chamfering, a welding seem is obtained and can be seen as 90 in FIG. 1. This seam 90 locally affects the pulley and the shaft. The effect of the weld is to join the pulley and the shaft, thereby ensuring the continuity of the material. The welding can be, for example, of the TIG electric arc type.

The welding is carried out in an initial embodiment without contact by means of a welding process using a tungsten electrode under an inert gas, such as argon or helium, thereby ensuring a better penetration and a better appearance of the weld. The heat energy generated by the arc produces local melting of the pulley to be assembled.

As an alternative, the TIG welding can be effected using a filler metal, such as mild steel or stainless steel.

In all cases, the welded seam is well executed and has the following characteristics:

It has a slightly convex profile.

After cooling, its surface is soft and regular, in such a manner that it is less likely to collect dust.

The welding is fact and penetrating.

The system of welding used means that only a small surface area is affected by the welding.

The welding electrode can be turned and can be advantageously angled with regard to the area to be welded.

Alternatively, a laser welding system can be used.

In another embodiment, the laser beam is guided sequentially.

Clearly, the welding can also be carried out using the transparency laser welding method. In this case, the welding can be carried out between the ends of the threaded section 13, especially when this threaded section works in conjunction with a screw tapped section of a sleeve of the pulley.

As an alternative, instead of producing a welding seam 90, the welding is carried out at a minimum of two points.

In this case, instead of being chamfered, the front face 40, 140 comprises centrally a number of notches, with the actual number being determined by the number of these welding points.

In a further embodiment, the welding is carried out using a filler material and can be, for example, of the Metal Inert Gas (MIG) type.

In this case, the electrode is represented by the filler metal, for example, mild steel or stainless steel. The gas can be, for example, argon or helium.

As another alternative, the welding can be of the Metal Active Gas (MAG) type.

This form of welding differs from the MIG type in that it uses an active gas, such as argon mixed with $CO_2$.

In all cases, in a welding system that uses a filler metal, the arc produces local melting of the pulley, the shaft and the filler metal to produce the melting bath and, once this has cooled, the welding seam. It will be appreciated that this system of welding is possible because of the fact that the pulley is screwed onto the shaft and because the assembly device 9 comprises only a small number of parts.

In fact, a solution could be devised in which the threaded end 13 is extended to allow for the addition of a support washer and a locking nut and the addition of channels between the sections 16 and 18.

In this case, however, the number of components would be increased and the nut and the support washer are likely to complicate the welding process. As a result of the device 9 on the screwed pulley, there is access to the tip of the threaded end 13 to the cavity 19, which is not hindered by the presence of the nut.

In accordance with one characteristic, part of the screwing effect is obtained from the tension of the pulley.

More precisely, after the second stage of the screwing under the tension of the manufacturing process, a third stage is carried out, during which the shaft is presented vertically with its drive member to proceed with the welding at the bottom level.

More precisely, a number of pallets are placed on a conveyor.

Each pallet is perforated to allow for the passage of the pulley, with the front bearing block of the alternator or the starter-alternator being, in one method of construction, in contact with the upper face of the pallet, which thus vertically carried the rotating electrical motor.

The conveyor is brought to a stop in such a manner that a pallet having a motor in a vertical position is located directly above the welding motor and the welding operation is then carried out from the side of the lower face of the pallet in other words, from below the pulley.

After that the conveyor system is restarted to move the pallet with the welded pulley until a second pallet arrives, with a second motor in a vertical position below the welding motor for a further pulley to be welded and so on.

With the front bearing block of the motor being at the perforated stage, part of this configuration is used so that, in another method of construction, the front bearing block can be indexed angularly by means of at least two indexing members on the pallet, each one of which engages in a calibrated hole of the front bearing block.

In a further method of construction, the welding torch or the laser beam is halted between two consecutive pulleys; this stopping action is faster with the laser beam. In this way, the weld is clean.

Alternatively, the laser beam or the welding torch is not halted.

The welding torch or the laser beam are inclined in the manner described above in another form of the construction.

The welding torch or the laser beam can be turned in relation to the pallet carrying the pulley to be welded or alternatively the pallet can be turned in relation to the welding torch or the laser beam.

Clearly, the present invention is not restricted to the examples given above of its construction.

In this way, as an alternative, the rotor 2 can be replaced by a rotor with projecting poles and/or permanent magnets.

The presence of the two ventilators is not mandatory and the front ventilator 3 can be omitted.

In this method of construction as shown in FIG. 1, the motor is cooled by a flow of air. As an alternative, the motor can be cooled by a flow of liquid, which means that the use of ventilators can be dispensed with.

Clearly the present invention can be used in other systems involving a rotating electrical motor, in which the rotary action is performed by a drive member attached to a rotating shaft. Thus the solution afforded by the present invention applies to the starters of heat engines comprising a drive pulley of the type described for example in the document EP A 1 293 665.

In this case, the assembly comprising the locking nut and the supporting washer can be dispensed with and the pulley can be screwed onto the threaded end of the shouldered shaft followed by a welding operation.

In the light of the present document, it can be seen that the axial stop used to impart tension to the assembly device is an alternative constituted by a shoulder effect of the shaft.

It can be seen that the shaft 1 can be driven by the rotor of the machine with the interposition of a free wheel and a gear train. The invention can also be applied to a starter-alternator having a gear train in the manner described in the document U.S. Pat. No. 5,418,400.

In all cases, the shaft 1 of the rotating electrical motor is connected directly to the rotor (FIG. 1) or indirectly to the rotor as described in the documents EP A 1 293 665 and U.S. Pat. No. 5,418,400. The shaft 1 is therefore connected in all cases to the rotor of the rotating electrical motor.

Clearly, the casing of the motor can, regardless of the construction, comprise a front bearing block having a lug that penetrates the cavity of the pulley as is shown in the document EP A 1 293 665 quoted above. In this case, the internal tool 52 can be preserved and the external tool 53 can comprise two stops, for example, two diametrically opposed stops, each of which engage in a local hollow set at a level of the front face of the pulley, for example, at the level of the outer periphery of the pulley at the place where the thickness of the material is at its greatest.

At its outer periphery, the pulley 8 can have a number of axially orientated teeth distributed circumferentially and in a regular manner so as to operate additionally in conjunction with a toothed belt.

Alternatively, these teeth can operate in conjunction with a chain that forms part of the device that imparts movement between the heat engine and the shaft of the rotating electrical motor. In this case, the pulley is in the form of a toothed wheel.

As a further alternative, this device for the transmission of movement comprises a number of gears; in this case, the pulley is replaced by a gearwheel.

The pulley 8 has therefore the particular shape of a drive member comprising, as an alternative, a toothed wheel or a gearwheel, with this member being a part of device for imparting movement between the shaft 1 and a heat engine, or as an alternative, an electrical motor.

Clearly, in accordance with one embedment of the invention, the front threaded end can be extended so that it projects axially in relation to the front face of the base-piece 21 or the sleeve in such a manner that the welding is not necessarily obliged at the end of the threaded part 13 of the shaft 1.

The front end of the shaft can be in the form of a shorter, smooth section.

In all cases, the shaft 1 has, at its front, a threaded part 13 on which a drive member, here a pulley, is securely mounted in such a way that it can be moved and rotated and which has an internal thread 17 in the form of a tapped thread.

The invention claimed is:

1. A device for assembling, by screwing, a drive member with a shaft, the drive member including a base section (21) or a sleeve (120), the shaft intended to be coupled to a rotor of a rotating electrical motor (8), the device including:
   a cavity (19) delineated by the base section (21) or the sleeve (120);
   a central hole (16, 17) formed in the base section (21) or the sleeve (120) of the drive member, the central hole of the drive member having an internally threaded section (17), the central hole opening out at the level of a front face of the base section (21) or of the sleeve;

a threaded section (13) provided at a front end of the shaft (1), the threaded section of the shaft intended to work in conjunction with the internally threaded section (17) of the drive member for screwing the drive member to the shaft; and a supplementary welded connection between the front face (40) of the base section (21) or the sleeve (120) of the drive member (8) and the threaded section (13) of the shaft (1);

one of the front face (40) of the base section (21) and the front face (140) of the sleeve (120) of the drive member (8) being chamfered; and the central hole (16, 17) in the front face of the base section (21) or the front face of the sleeve being open out at the level of the chamfer.

2. The device for assembling in accordance with claim 1, wherein the supplementary connection comprises a welding of the Tungsten Inert Gas (TIG) type carried out with or without a filler material.

3. The device for assembling in accordance with claim 1, wherein the supplementary welded connection comprises a laser welding of the transparency type.

4. The device for assembling in accordance with claim 1, wherein the supplementary welded connection comprises a welding of one of a MIG and a MAG type.

5. The device in accordance with claim 1, wherein the shaft (1) comprises an axial stop (50) for the drive unit, the drive unit is subjected to tension from the assembly device (9).

6. The device in accordance with claim 1, wherein the drive unit (8) and the threaded part (13) of the shaft (1) comprise indentations (56, 51) intended to work in junction with additional indentations in tools (53, 52) for screwing action of the drive unit (8) on the threaded end of the shaft (1).

7. The device in accordance with claim 1, wherein the drive unit is a pulley screwed onto the shaft, the shaft is intended to be coupled to the rotor of an alternator or a starter-alternator.

8. A process for the manufacture of an assembly device, the assembly device provided for assembling, by screwing, a drive member with a shaft, the drive member including a base section (21) or a sleeve (120), the shaft intended to be coupled to a rotor of a rotating electrical motor, the device including:

a cavity (19) delineated by the base section (21) or the sleeve (120);

a central hole (16, 17) formed in the drive member, the central hole having an internally threaded section (17), the central hole opening out at the level of a front face of the base section (21) or of the sleeve;

a threaded section (13) provided at a front end of the shaft (1), the threaded section of the shaft intended to work in conjunction with the internally threaded section (17) of the drive member for screwing the drive member to the shaft; and a supplementary welded connection between the front face (40) of the base section (21) or the sleeve (120) of the drive member (8) and the threaded section (13) of the shaft (1);

one of the front face (40) of the base section (21) and the front face (140) of the sleeve (120) of the drive member (8) being chamfered; and the central hole (16, 17) in the front face of the base section (21) or the front face of the sleeve being open out at the level of the chamfer;

the process comprising the step of screwing the drive member onto the threaded of the shaft followed by a welding operation, during which the shaft together with the fitted drive member is presented vertically so that the welding operation is carried out from underneath the drive member.

* * * * *